(12) United States Patent
Wan et al.

(10) Patent No.: US 11,481,419 B2
(45) Date of Patent: Oct. 25, 2022

(54) METHOD AND APPARATUS FOR EVALUATING MATCHING DEGREE BASED ON ARTIFICIAL INTELLIGENCE, DEVICE AND STORAGE MEDIUM

(71) Applicant: BEIJING BAIDU NETCOM SCIENCE AND TECHNOLOGY CO., LTD., Haidian District Beijing (CN)

(72) Inventors: Shengxian Wan, Haidian District Beijing (CN); Yu Sun, Haidian District Beijing (CN); Dianhai Yu, Haidian District Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 1112 days.

(21) Appl. No.: 15/981,334

(22) Filed: May 16, 2018

(65) Prior Publication Data

US 2018/0336206 A1    Nov. 22, 2018

(30) Foreign Application Priority Data

May 17, 2017  (CN) .......................... 201710348231.5

(51) Int. Cl.
  *G06N 3/04*   (2006.01)
  *G06F 16/33*  (2019.01)
  (Continued)

(52) U.S. Cl.
  CPC ...... *G06F 16/3347* (2019.01); *G06F 16/3334* (2019.01); *G06F 40/258* (2020.01);
  (Continued)

(58) Field of Classification Search
  CPC .......................... G06N 3/0454; G06N 3/0445
  See application file for complete search history.

(56) References Cited

U.S. PATENT DOCUMENTS 10,606,846 B2 *  3/2020  Li ........................... G06N 7/005
2014/0379386 A1  12/2014  Drennan, III
2020/0042597 A1*  2/2020  Wu ......................... H04L 51/02

FOREIGN PATENT DOCUMENTS

CN    103389979 A    11/2013
CN    104598445 A    5/2015
(Continued)

OTHER PUBLICATIONS

Minjoon Seo, "Bi-Directional Attention Flow for Machine Comprehension", 2017 (Year: 2017).*
(Continued)

*Primary Examiner* — Ann J Lo
*Assistant Examiner* — Van C Mang
(74) *Attorney, Agent, or Firm* — Brooks Kushman P.C.

(57) ABSTRACT

The present disclosure provides a method and apparatus for evaluating a matching degree based on artificial intelligence, a device and a storage medium, wherein the method comprises: respectively obtaining word expressions of words in a query and word expressions of words in a title; respectively obtaining context-based word expressions of words in the query and context-based word expressions of words in the title according to the word expressions; generating matching features according to obtained information; determining a matching degree score between the query and the title according to the matching features. The solution of the present disclosure may be applied to improve the accuracy of the evaluation result.

13 Claims, 3 Drawing Sheets

(51) Int. Cl.
  *G06N 5/04*    (2006.01)
  *G06K 9/62*    (2022.01)
  *G06F 40/258*  (2020.01)
  *G06V 30/262*  (2022.01)

(52) U.S. Cl.
  CPC ......... *G06K 9/6201* (2013.01); *G06K 9/6274* (2013.01); *G06N 3/0445* (2013.01); *G06N 3/0454* (2013.01); *G06N 5/046* (2013.01); *G06V 30/268* (2022.01)

(56) References Cited

FOREIGN PATENT DOCUMENTS

| CN | 105955976 A | 9/2016 |
| CN | 106570191 A | 4/2017 |

OTHER PUBLICATIONS

Zhang, "Attentive Interactive Neural Networks for Answer Selection in Community Question Answering", 2017 (Year: 2017).*
Chinese Office Action dated Feb. 3, 2020, for related Chinese Appln. No. 2017103482315; 4 Pages.
Chinese Search Report dated Jan. 21, 2020 for related Chinese Appln. No. 2017103482315; 2 Pages.
Search Report of Chinese application No. 2017103482315 dated Sep. 24, 2020, 2 pages.

* cited by examiner

METHOD AND APPARATUS FOR EVALUATING MATCHING DEGREE BASED ON ARTIFICIAL INTELLIGENCE, DEVICE AND STORAGE MEDIUM

The present application claims the priority of Chinese Patent Application No. 2017103482315, filed on May 17, 2017, with the title of "Method and apparatus for evaluating matching degree based on artificial intelligence, device and storage medium". The disclosure of the above applications is incorporated herein by reference in its entirety

FIELD OF THE DISCLOSURE

The present disclosure relates to computer application technologies, and particularly to a method and apparatus for evaluating a matching degree based on artificial intelligence, a device and a storage medium.

BACKGROUND OF THE DISCLOSURE

Artificial intelligence AI is a new technical science for researching and developing theories, methods, technologies and application systems for simulating, extending and expanding human intelligence. Artificial intelligence is a branch of computer sciences and attempts to learn about the essence of intelligence, and produces a new intelligent machine capable of responding in a manner similar to human intelligence. The studies in the field comprise robots, language recognition, image recognition, natural language processing, expert systems and the like.

A core task of information retrieval is calculating a semantic relevance degree between a user-input query and documents (doc) serving as retrieving objects.

Specifically, it is feasible to evaluate the matching degree between the query and titles of the documents, e.g., calculate a matching degree score between the query and the titles, rank the documents in a descending order of the scores, and then return top N documents after the ranking to the user as a retrieval result.

In the prior art, when the matching degree score between the query and the title is calculated, the following manner is usually employed: first using a Convolutional Neural Network CNN or a Recurrent Neural Network RNN or the like to respectively obtain expressions of the query and title, then, based on the two expressions, calculating for example cosine similarity to obtain the matching degree score between the query and the title.

However, in the above manner, a paragraph of complicated text, as a whole, is mapped to a vector (expression) in a low-dimensional space, and some key information might get lost during compression. Therefore, rough evaluation can only be performed for the matching degree of two texts on the whole, and the accuracy of the evaluation result is low.

SUMMARY OF THE DISCLOSURE

In view of the above, the present disclosure provides a method and apparatus for evaluating a matching degree based on artificial intelligence, a device and a storage medium, which can improve the accuracy of the evaluation result.

Specific technical solutions are as follows:

A method for evaluating a matching degree based on artificial intelligence, comprising:

respectively obtaining word expressions of words in a query and word expressions of words in a title;

respectively obtaining context-based word expressions of words in the query and context-based word expressions of words in the title according to the word expressions;

generating matching features according to obtained information;

determining a matching degree score between the query and the title according to the matching features.

According to a preferred embodiment of the present disclosure, the respectively obtaining word expressions of words in a query and word expressions of words in a title comprises:

respectively embedding words in the query to form a low-dimensional vector, thereby obtaining a sequence Qe= [q1, qi, qm];

wherein m represents the number of words included in the query, qi represents the low-dimensional vector of the $i^{th}$ word in the query, i is a positive integer, and $1 \le i \le m$;

respectively embedding words in the title to form a low-dimensional vector, thereby obtaining a sequence Te= [t1, . . . , tj, . . . , tn];

wherein n represents the number of words included in the title, tj represents the low-dimensional vector of the $j^{th}$ word in the title, j is a positive integer, and $1 \le j \le n$;

According to a preferred embodiment of the present disclosure, the respectively obtaining context-based word expressions of words in the query and context-based word expressions of words in the title according to the word expressions comprises:

inputting the Qe into a bidirectional Recurrent Neural Network RNN to respectively obtain a processed output Q1 in a left-right direction and a processed output Q2 in a right-left direction;

inputting the Te into the bidirectional RNN to respectively obtain a processed output T1 in a left-right direction and a processed output T2 in a right-left direction;

putting together the Qe, Q1 and Q2 to obtain Q (m, 3d), wherein the d represents an expression dimension, and embedding and the bidirectional RNN use the same expression dimension;

putting together the Te, T1 and T2 to obtain T (n, 3d);

considering a 3d-long vector corresponding to each word in the query and the title as the context-based word expression of the word.

According to a preferred embodiment of the present disclosure, the generating matching features according to obtained information comprises:

generating local matching features according to the obtained information;

generating advanced matching features according to the local matching features.

According to a preferred embodiment of the present disclosure, the generating local matching features according to the obtained information comprises:

according to context-based word expressions of respective words, calculating a matching degree of any two words in words in the query and words in the title respectively in different matching degree calculating manners, and obtaining a 3-dimensional tensor (m, n, t);

wherein t represents a t-dimensional vector, t matching degrees are respectively calculated with respect to each group of words Q[i] and T[j], the t matching degrees constitute a t-dimensional vector, Q[i] represents words in the query, and T[j] represents words in the title;

each value (i, j, k) in the tensor represents the $k^{th}$ matching degree corresponding to Q[i] and T[j], and $1 \le k \le t$.

According to a preferred embodiment of the present disclosure, the generating advanced matching features according to the local matching features comprises:

inputting (m, n, t) to a Convolutional Neural Network CNN, and considering the obtained output (m, n, t1), ..., (m, n, tw) as advanced matching features, wherein w is a positive integer and represents the number of convolution layers included in CNN.

According to a preferred embodiment of the present disclosure, determining a matching degree score between the query and the title according to the matching features comprises:

putting together the (m, n, t) and the advanced matching features to obtain (m, n, t+t1+ ... +tw);

regarding each (m, n) matching matrix, respectively determining a (m, k') sequence expression in a manner of pooling as per row, k' being a positive integer, thereby obtaining (m, (t+t1+ ... +tw)*k');

inputting the (m, (t+t1+ ... +tw)*k') into the bidirectional RNN to obtain an expression at the last position of the bidirectional RNN;

determining the matching degree score according to the expression at the last position.

According to a preferred embodiment of the present disclosure, the step of, regarding each (m, n) matching matrix, respectively determining a (m, k') sequence expression in a manner of pooling as per row, comprises:

regarding n values in each row of (m, n), respectively selecting k' largest values therefrom, ranking them in a descending order and thereby obtaining (m, k'), wherein k'≤n.

According to a preferred embodiment of the present disclosure, the expression at the last position is a 2f-long vector, and f represents an expression dimension;

the determining the matching degree score according to the expression at the last position comprises:

inputting the 2f-long vector into a fully-connected network including a single hidden layer, and obtaining the output matching degree score.

An apparatus for evaluating a matching degree based on artificial intelligence, comprising: an expression processing unit, a feature processing unit and a scoring unit;

the expression processing unit is configured to respectively obtain word expressions of words in a query and word expressions of words in a title; respectively obtain context-based word expressions of words in the query and context-based word expressions of words in the title according to the word expressions;

the feature processing unit is configured to generate matching features according to information obtained by the expression processing unit;

the scoring unit is configured to determine a matching degree score between the query and the title according to the matching features.

According to a preferred embodiment of the present disclosure, the expression processing unit comprises: a first processing sub-unit and a second processing sub-unit;

the first processing sub-unit is configured to respectively embed words in the query to form a low-dimensional vector, thereby obtaining a sequence Qe=[q1, ..., qi, ..., qm];

wherein m represents the number of words included in the query, qi represents the low-dimensional vector of the $i^{th}$ word in the query, i is a positive integer, and 1≤i≤m;

respectively embed words in the title to form a low-dimensional vector, thereby obtaining a sequence Te=[t1, ..., tj, ..., tn];

wherein n represents the number of words included in the title, tj represents the low-dimensional vector of the $j^{th}$ word in the title, j is a positive integer, and 1≤j≤n;

the second processing sub-unit is configured to respectively obtain the context-based word expressions of words in the query and context-based word expressions of words in the title according to Qe and Te.

According to a preferred embodiment of the present disclosure, the second processing sub-unit is configured to input the Qe into a bidirectional Recurrent Neural Network RNN to respectively obtain a processed output Q1 in a left-right direction and a processed output Q2 in a right-left direction;

input the Te into the bidirectional RNN to respectively obtain a processed output T1 in a left-right direction and a processed output T2 in a right-left direction;

put together the Qe, Q1 and Q2 to obtain Q (m, 3d), wherein the d represents an expression dimension, and embedding and the bidirectional RNN use the same expression dimension;

put together the Te, T1 and T2 to obtain T (n, 3d);

consider a 3d-long vector corresponding to each word in the query and the title as the context-based word expression of the word.

According to a preferred embodiment of the present disclosure, the feature processing unit comprises: a third processing sub-unit and a fourth processing sub-unit;

the third processing sub-unit is configured to generate local matching features according to the information obtained by the expression processing unit;

the fourth processing sub-unit is configured to generate advanced matching features according to the local matching features.

According to a preferred embodiment of the present disclosure, the third processing sub-unit, according to context-based word expressions of respective words, calculates a matching degree of any two words in words in the query and words in the title respectively in different matching degree calculating manners, and obtains a 3-dimensional tensor (m, n, t);

wherein t represents a t-dimensional vector, t matching degrees are respectively calculated with respect to each group of words Q[i] and T[j], the t matching degrees constitute a t-dimensional vector, Q[i] represents words in the query, and T[j] represents words in the title;

each value (i, j, k) in the tensor represents the $k^{th}$ matching degree corresponding to Q[i] and T[j], and 1≤k≤t.

According to a preferred embodiment of the present disclosure, the fourth processing sub-unit inputs (m, n, t) to a Convolutional Neural Network CNN, and considers the obtained output (m, n, t1), ..., (m, n, tw) as advanced matching features, wherein w is a positive integer and represents the number of convolution layers included in CNN.

According to a preferred embodiment of the present disclosure, the scoring unit puts together the (m, n, t) and the advanced matching features to obtain (m, n, t+t1+ ... +tw);

regarding each (m, n) matching matrix, respectively determines a (m, k') sequence expression in a manner of pooling as per row, k' being a positive integer, thereby obtaining (m, (t+t1+ ... +tw)*k');

inputs the (m, (t+t1+ ... +tw)*k') into the bidirectional RNN to obtain an expression at the last position of the bidirectional RNN;

determines the matching degree score according to the expression at the last position.

According to a preferred embodiment of the present disclosure, the scoring unit, regarding n values in each row of (m, n), respectively selects k' largest values therefrom, ranks them in a descending order and thereby obtains (m, k'), wherein k'≤n.

According to a preferred embodiment of the present disclosure, the expression at the last position is a 2f-long vector, and f represents an expression dimension;

the scoring unit inputs the 2f-long vector into a fully-connected network including a single hidden layer, and obtains the output matching degree score.

A computer device, comprising a memory, a processor and a computer program which is stored on the memory and runs on the processor, the processor, upon executing the program, implementing the above-mentioned method.

A computer-readable storage medium on which a computer program is stored, the program, when executed by the processor, implementing the aforesaid method.

As can be seen from the above introduction, the solution of the present disclosure is employed to construct the bottom-level word expressions and context-based word expressions. These expressions can not only emphasize local information but also merge global information, and can better reflect the matching degree between the query and the title and thereby improve the accuracy of the evaluation result.

DETAILED DESCRIPTION OF PREFERRED EMBODIMENTS

Technical solutions of the present disclosure will be described in more detail in conjunction with figures and embodiments to make technical solutions of the present disclosure clear and more apparent.

Obviously, the described embodiments are partial embodiments of the present disclosure, not all embodiments. Based on embodiments in the present disclosure, all other embodiments obtained by those having ordinary skill in the art without making inventive efforts all fall within the protection scope of the present disclosure.

Figure 1:
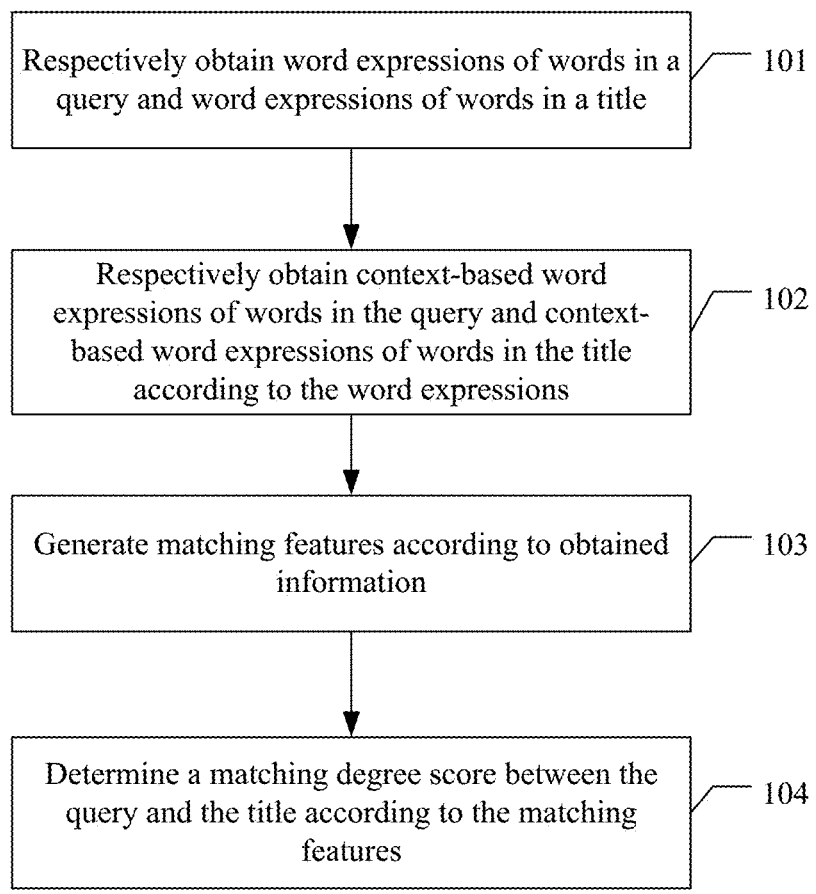
FIG. 1 is a flow chart of an embodiment of a method for evaluating a matching degree based on artificial intelligence according to the present disclosure.

FIG. 1 is a flow chart of an embodiment of a method for evaluating a matching degree based on artificial intelligence according to the present disclosure. As shown in FIG. 1, the embodiment comprises the following specific implementation mode.

In 101 are respectively obtained word expressions of words (keywords) in a query and word expressions of words in a title.

Specifically, words in the query may be respectively embedded to form a low-dimensional vector, thereby obtaining a sequence Qe=[q1, . . . , qi, . . . , qm].

Wherein m represents the number of words included in the query, qi represents the low-dimensional vector of the $i^{th}$ word in the query, i is a positive integer, and 1≤i≤m.

In addition, words in the title may be respectively embedded to form a low-dimensional vector, thereby obtaining a sequence Te=[t1, . . . , tj, . . . , tn].

Wherein n represents the number of words included in the title, tj represents the low-dimensional vector of the $j^{th}$ word in the title, j is a positive integer, and 1≤j≤n.

In practical application, it is necessary to perform pre-processing such as word segmentation respectively for the query and the title to obtain words in the query and the title.

The query is taken as an example. Assume that it includes a total of four words: word 1, word 2, word 3 and word 4, the word 1, word 2, word 3 and word 4 may be respectively embedded to form a low-dimensional vector, thereby obtaining Qe=[q1, q2, q3, q4]. How to obtain the low-dimensional vector is of prior art.

In 102, context-based word expressions of words in the query and context-based word expressions of words in the title are respectively obtained according to the word expressions.

After the word expressions of words in the query and word expressions of words in the title are respectively obtained, the context-based word expressions of words in the query and context-based word expressions of words in the title may be further obtained.

For example, it is feasible to input Qe into a bidirectional RNN to respectively obtain a processed output Q1 in a left-right direction and a processed output Q2 in a right-left direction, input Te into a bidirectional RNN to respectively obtain a processed output T1 in a left-right direction and a processed output T2 in a right-left direction.

That is, the Qe and Te are respectively input into different bidirectional RNNs to respectively obtain Q1 and Q2 and T1 and T2.

The embedding and the bidirectional RNN may use the same expression dimension d. A specific value of d depends on actual needs. Hence, the magnitude of the Qe, Q1 and Q2 is (m, d), and correspondingly the magnitude of Te, T1 and T2 is (n, d).

Qe, Q1 and Q2 may be put together to obtain Q (m, 3d), and Te, T1 and T2 may be put together to obtain T (n, 3d). As such, each word in the query and the title respectively corresponds to a vector which is 3d long. The vector is the context-based word expression.

It can be seen that the put-together is a put-together as per column.

Regarding the 3d-long vector corresponding to each word, the first d dimensions represent the embedding result of the word, middle d dimensions represent a left context of the word, and last d dimensions represent a right context of the word. Hence, the 3d-long vector is a context-based word expression including contextual information of the word.

In 103, a matching feature is generated according to the obtained information.

First, it is feasible to generate local matching features according to the obtained information, and then further generate advanced matching features according to the local matching features. Manners of acquiring the local matching features and the advanced matching features are respectively described below in detail.

1) Local Matching Features

All local matching features are obtained by matching based on previously-obtained expressions.

Specifically, it is feasible to, according to context-based word expressions of respective words, calculate a matching degree of any two words in words in the query and words in the title respectively in different matching degree calculating manners, and obtain a 3-dimensional tensor (m, n, t).

Wherein t represents a t-dimensional vector, t matching degrees are respectively calculated with respect to each group of words Q[i] and T[j], the t matching degrees constitute a t-dimensional vector, Q[i] represents words in the query, and T[j] represents words in the title.

Each value (i, j, k) in the tensor represents the $k^{th}$ matching degree corresponding to Q[i] and T[j], and $1 \leq k \leq t$.

An example is taken for illustration.

Assume that the query includes a total of two words, namely, word 1 and word 2, and the title also include two words, namely, word 3 and word 4;

Regarding word 1 and word 3, t matching degrees may be calculated respectively in different matching degree calculating manners;

Regarding word 1 and word 4, t matching degrees may be calculated respectively in different matching degree calculating manners;

Regarding word 2 and word 3, t matching degrees may be calculated respectively in different matching degree calculating manners;

Regarding word 2 and word 4, t matching degrees may be calculated respectively in different matching degree calculating manners.

The matching degree between two words may be calculated according to the context-based word expressions of the two words.

A specific matching degree calculating manner may depend on actual needs, for example may comprise many matching degree calculating manners such as a tensor neural network and cosine.

In addition, it is further feasible to employ a conventional keyword-based matching manner to construct different matching matrixes to facilitate merge of manual knowledge, i.e., people may use their knowledge to construct extra matching matrixes as matching features, thereby providing an excellent channel for introducing manual knowledge into scenarios such as information retrieval.

2) Advanced Matching Features

The tensor (m, n, t) obtained above includes word-level and context-based word-level matching features. On this basis, CNN may further be used to extract high-dimensional features.

As in an image, m and n are the size of the picture, and t is the number of feature maps.

(m, n, t) may be input to the CNN to obtain the output (m, n, t1), . . . , (m, n, tw) as advanced matching features, wherein w is a positive integer and represents the number of convolution layers included in CNN.

Assume that the number of convolution layers is 1, (m, n, t1) may be obtained after (m, n, t) is input to CNN, wherein t1 is the number of kernel of the CNN. In practical application, a dynamic padding manner may be employed to make input and output of the convolution the same in magnitude.

Furthermore, a plurality of convolution layers may be stacked to extract higher-level matching features.

In 104, a matching degree score between the query and the title is determined according to the matching features.

First, it is feasible to put together (m, n, t) and the obtained advanced matching features to obtain (m, n, t+t1+ . . . +tw). Assume that the number of the convolution layers is 2, (m, n, t), . . . , (m, n, t1) and (m, n, t2) are put together as (m, n, t+t1+t2), that is to say, t+t1+t2 matching matrixes which are sized as (m, n).

It is feasible to, regarding each (m, n) matching matrix, determine a (m, k') sequence expression in a manner of pooling as per row, k' being a positive integer, thereby obtaining (m, (t+t1+ . . . +tw)*k').

For example, it is feasible, regarding n values in each row of (m, n), respectively select k' largest values therefrom, rank them in a descending order and thereby obtain (m, k'), wherein $k' \leq n$. Assume that there are a total of t+t1+t2 matching matrixes, the obtained output is (m, (t+t1+t2)*k').

A visual meaning of the above procedure is finding largest (t+t1+t2)*k' features from matching features corresponding to the word. Each word in the query is very important and used to clearly describe the user's information demands. These features represent situations of the title satisfying information demands in the query.

It may be known from the above manner that a final best-matched location happens at which specific position (i, j) in the (m, n) matching matrix, so it can be seen that words in the query specifically match with which words in the title, that is well illustrated.

The (m, (t+t1+ . . . +tw)*k') obtained above is a sequence that becomes longer. The bidirectional RNN manner may be employed to merge the information of the sequence, and an expression at the last position of the bidirectional RNN may be considered as the expression after the merging.

That is, (m, (t+t1+ . . . +tw)*k') is input into the bidirectional RNN to obtain the expression at the last position of the bidirectional RNN, and thereby determine the matching degree score between the query and the title according to the expression at the last position.

The expression at the last position may be a 2f-long vector, wherein f represents an expression dimension and its specific value may depend on actual needs. Since the bidirectional RNN is employed, it is feasible to, with respect to each direction, obtain a f-long vector and combine the vectors as the 2f-long vector.

Finally, the 2f-long vectors may be input into a fully-connected network including a single hidden layer, thereby obtaining the output matching degree score.

In the scenario of information retrieval, after respectively calculating matching degree scores of the user-input query and the titles of respective documents, it is feasible to rank the documents in a descending order of scores, and return top N documents after the ranking as a retrieval result to the user, N being a positive integer.

Figure 2:
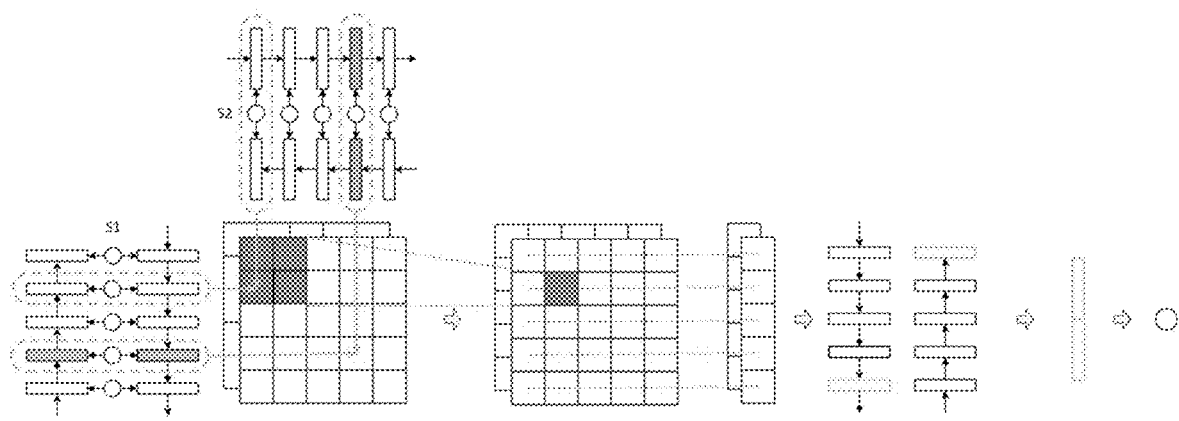
FIG. 2 is a schematic diagram of a procedure of obtaining a matching degree score between a query and a title according to the present disclosure.

To conclude the above introduction, FIG. 2 is a schematic diagram of a procedure of obtaining a matching degree score between a query and a title according to the present disclosure. Specific implementation may be found from the previous relevant depictions and no longer detailed.

It can be seen that the solution of the above embodiment is employed to construct the bottom-level word expressions and context-based word expressions. These expressions can not only emphasize local information but also merge global information, and can better reflect the matching degree between the query and the title and thereby improve the accuracy of the evaluation result.

Furthermore, with the solution of the above embodiment being used, all local key matching features can be retained very well. It is feasible to, based on these local matching features, further extract advanced matching features and therefore effectively capture semantic match and matching proximity information which are of great importance to information retrieval.

In addition, after the matching features are obtained, pooling may be performed according to each word in the query, to thereby build a model to reflect the title's coverage of the query's all key information demands. Since all matching matrixes obtained in the middle participate in the pooling, a finally-obtained result is situations of coverage of words' information demands at multiple levels, and has an excellent interpretability. Which word in the title specifically satisfies each word in the query can be traced back based on the pooling result.

The above introduces the method embodiments. The solution of the present disclosure will be further described through an apparatus embodiment.

Figure 3:
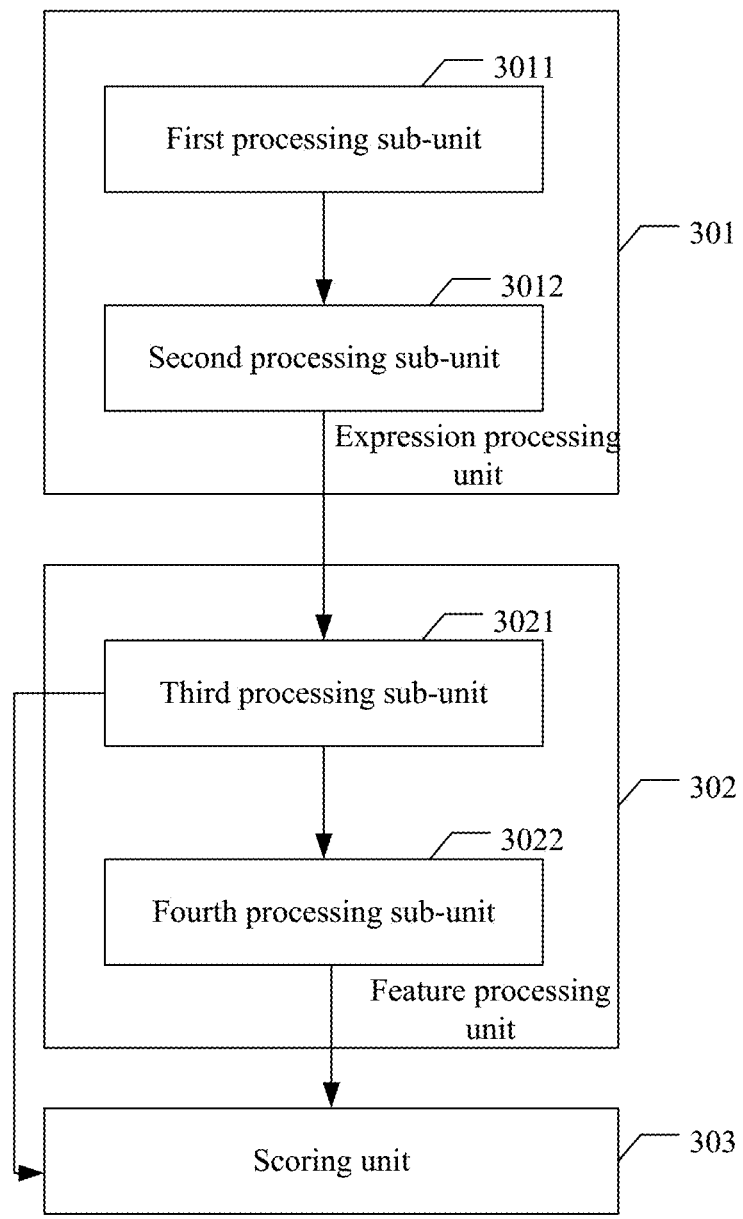
FIG. 3 is a block diagram of an embodiment of an apparatus for evaluating a matching degree based on artificial intelligence according to the present disclosure.

FIG. 3 is a block diagram of an embodiment of an apparatus for evaluating a matching degree based on artificial intelligence according to the present disclosure. As shown in FIG. 3, the apparatus comprises: an expression processing unit 301, a feature processing unit 302 and a scoring unit 303.

The expression processing unit 301 is configured to respectively obtain word expressions of words in a query and word expressions of words in a title; respectively obtain context-based word expressions of words in the query and context-based word expressions of words in the title according to the word expressions.

The feature processing unit 302 is configured to generate matching features according to information obtained by the expression processing unit 301.

The scoring unit 303 is configured to determine a matching degree score between the query and the title according to the matching features.

As shown in FIG. 3, the expression processing unit 301 may specifically comprise: a first processing sub-unit 3011 and a second processing sub-unit 3012.

The first processing sub-unit 3011 is configured to respectively embed words in the query to form a low-dimensional vector, thereby obtaining a sequence Qe=[q1, ..., qi, ..., qm];

wherein m represents the number of words included in the query, qi represents the low-dimensional vector of the $i^{th}$ word in the query, i is a positive integer, and 1≤i≤m;

respectively embed words in the title to form a low-dimensional vector, thereby obtaining a sequence Te=[t1, ..., tj, ..., tn];

wherein n represents the number of words included in the title, tj represents the low-dimensional vector of the $j^{th}$ word in the title, j is a positive integer, and 1≤j≤n;

the second processing sub-unit 3012 is configured to respectively obtain the context-based word expressions of words in the query and context-based word expressions of words in the title according to Qe and Te.

Specifically, the second processing sub-unit 3012 is configured to input Qe into a bidirectional RNN to respectively obtain a processed output Q1 in a left-right direction and a processed output Q2 in a right-left direction;

input Te into the bidirectional RNN to respectively obtain a processed output T1 in a left-right direction and a processed output T2 in a right-left direction;

put together Qe, Q1 and Q2 to obtain Q (m, 3d), wherein d represents an expression dimension, and embedding and the bidirectional RNN use the same expression dimension;

put together Te, T1 and T2 to obtain T (n, 3d);

consider a 3d-long vector corresponding to each word in the query and the title as the context-based word expression of the word.

As shown in FIG. 3, the feature processing unit 302 may specifically comprise: a third processing sub-unit 3021 and a fourth processing sub-unit 3022.

The third processing sub-unit 3021 is configured to generate local matching features according to the information obtained by the expression processing unit.

The fourth processing sub-unit 3022 is configured to generate advanced matching features according to the local matching features.

The third processing sub-unit 3021 may, according to context-based word expressions of respective words, calculate a matching degree of any two words in words in the query and words in the title respectively in different matching degree calculating manners, and obtain a 3-dimensional tensor (m, n, t);

wherein t represents a t-dimensional vector, t matching degrees are respectively calculated with respect to each group of words Q[i] and T[j], the t matching degrees constitute a t-dimensional vector, Q[i] represents words in the query, and T[j] represents words in the title;

each value (i, j, k) in the tensor represents the $k^{th}$ matching degree corresponding to Q[i] and T[j], and 1≤k≤t.

A specific matching degree calculating manner may depend on actual needs, for example may comprise many matching degree calculating manners such as a tensor neural network and cosine.

The tensor (m, n, t) obtained above includes word-level and context-based word-level matching features. On this basis, CNN may further be used to extract high-dimensional features.

Correspondingly, the fourth processing sub-unit 3022 may input (m, n, t) to the CNN, and consider the obtained output (m, n, t1), ..., (m, n, tw) as advanced matching features, wherein w is a positive integer and represents the number of convolution layers included in CNN.

Assume that the number of convolution layers is 1, (m, n, t1) may be obtained after (m, n, t) is input to CNN, wherein t1 is the number of kernel of the CNN. In practical application, a dynamic padding manner may be employed to make input and output of the convolution the same in magnitude.

Furthermore, a plurality of convolution layers may be stacked to extract higher-level matching features.

Then, the scoring unit 303 may put together (m, n, t) and the advanced matching features to obtain (m, n, t+t1+ ... +tw). Assume that the number of the convolution layers is 2, (m, n, t), ..., (m, n, t1) and (m, n, t2) are put together as (m, n, t+t1+t2), that is to say, t+t1+t2 matching matrixes which are sized as (m, n).

Regarding each (m, n) matching matrix, the scoring unit 303 may determine a (m, k') sequence expression in a manner of pooling as per row, k' being a positive integer, thereby obtaining (m, (t+t1+ ... +tw)*k').

For example, it is feasible, regarding n values in each row of (m, n), respectively select k' largest values therefrom, rank them in a descending order and thereby obtain (m, k'), wherein k'≤n. Assume that there are a total of t+t1+t2 matching matrixes, the obtained output is (m, (t+t1+t2)*k').

The (m, (t+t1+ ... +tw)*k') obtained above is a sequence that becomes longer. The bidirectional RNN manner may be employed to merge the information of the sequence, and an expression at the last position of the bidirectional RNN may be considered as the expression after the merging.

That is, the scoring unit 303 may input (m, (t+t1+ ... +tw)*k') into the bidirectional RNN to obtain the expression at the last position of the bidirectional RNN, and thereby determine the matching degree score between the query and the title according to the expression at the last position.

The expression at the last position may be a 2f-long vector, wherein f represents an expression dimension and its specific value may depend on actual needs. Since the bidirectional RNN is employed, it is feasible to, with respect to each direction, obtain a f-long vector and combine the vectors as the 2f-long vector.

Finally, the 2f-long vectors may be input into a fully-connected network including a single hidden layer, thereby obtaining the output matching degree score.

Reference may be made to corresponding depictions in the aforesaid method embodiment for a specific workflow of the apparatus embodiment shown in FIG. 3. The workflow is not detailed any more.

It can be seen that the solution of the above embodiment is employed to construct the bottom-level word expressions and context-based word expressions. These expressions can not only emphasize local information but also merge global information, and can better reflect the matching degree between the query and the title and thereby improve the accuracy of the evaluation result.

Furthermore, with the solution of the above embodiment being used, all local key matching features can be retained very well. It is feasible to, based on these local matching features, further extract advanced matching features and therefore effectively capture semantic match and matching proximity information which are of great importance to information retrieval.

In addition, after the matching features are obtained, pooling may be performed according to each word in the query, to thereby build a model to reflect the title's coverage of the query's all key information demands. Since all matching matrixes obtained in the middle participate in the pooling, a finally-obtained result is situations of coverage of words' information demands at multiple levels, and has an excellent interpretability. Which word in the title specifically satisfies each word in the query can be traced back based on the pooling result.

Figure 4:
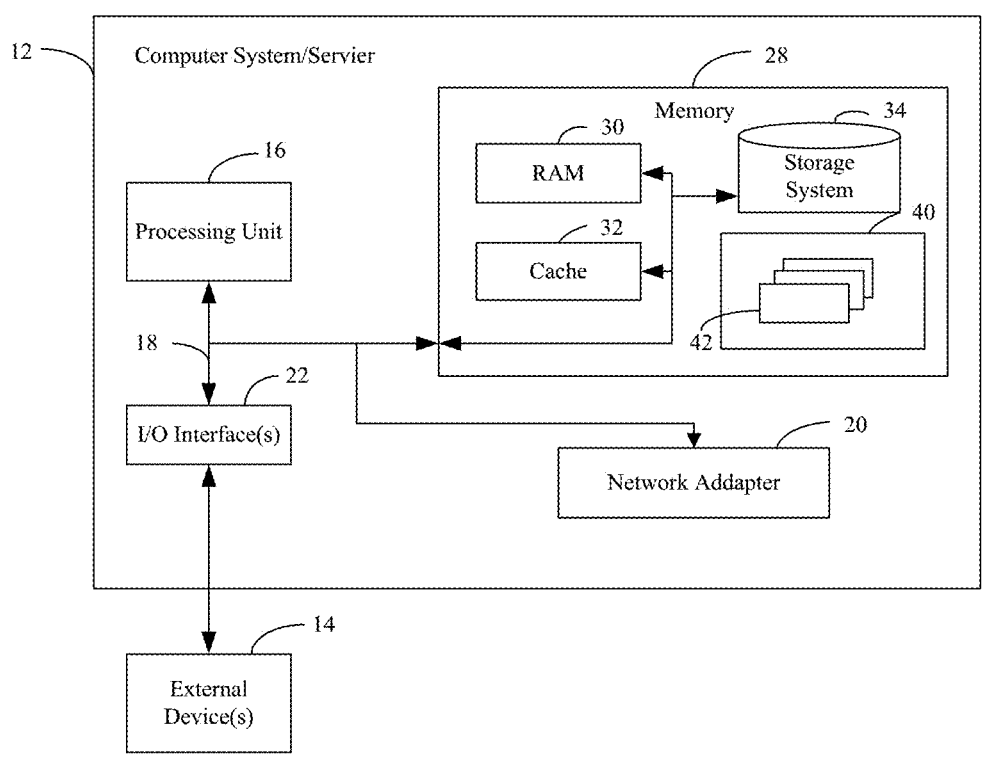
FIG. 4 illustrates a block diagram of an example computer system/server 12 adapted to implement an implementation mode of the present disclosure.

FIG. 4 illustrates a block diagram of an example computer system/server 12 adapted to implement an implementation mode of the present disclosure. The computer system/server 12 shown in FIG. 4 is only an example and should not bring about any limitation to the function and scope of use of the embodiments of the present disclosure.

As shown in FIG. 4, the computer system/server 12 is shown in the form of a general-purpose computing device. The components of computer system/server 12 may include, but are not limited to, one or more processors (processing units) 16, a memory 28, and a bus 18 that couples various system components including system memory 28 and the processor 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 4 and typically called a "hard drive"). Although not shown in FIG. 4, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. The memory 28 may include at least one program product having a set (e.g., at least one) of program modules that are configured to carry out the functions of embodiments of the present disclosure.

Program/utility 40, having a set (at least one) of program modules 42, may be stored in the system memory 28 by way of example, and not limitation, as well as an operating system, one or more disclosure programs, other program modules, and program data. Each of these examples or a certain combination thereof might include an implementation of a networking environment. Program modules 42 generally carry out the functions and/or methodologies of embodiments of the present disclosure.

Computer system/server 12 may also communicate with one or more external devices 14 such as a keyboard, a pointing device, a display 24, etc.; with one or more devices that enable a user to interact with computer system/server 12; and/or with any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted in FIG. 4, network adapter 20 communicates with the other communication modules of computer system/server 12 via bus 18. It should be understood that although not shown, other hardware and/or software modules could be used in conjunction with computer system/server 12. Examples, include, but are not limited to: microcode, device drivers, redundant processing units, external disk drive arrays, RAID systems, tape drives, and data archival storage systems, etc.

The processor 16 executes various function applications and data processing by running programs stored in the memory 28, for example, implement the method in the embodiments shown in FIG. 1, namely, respectively obtain word expressions of words in a query and word expressions of words in a title; respectively obtain context-based word expressions of words in the query and context-based word expressions of words in the title according to the word expressions; generate matching features according to obtained information; determine a matching degree score between the query and the title according to the matching features.

Reference may be made to related depictions in the above embodiments for specific implementations, which will not be detailed any more.

The present disclosure meanwhile provides a computer-readable storage medium on which a computer program is stored, the program, when executed by the processor, implementing the method stated in the embodiment shown in FIG. 1.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A method for evaluating a matching degree based on artificial intelligence, wherein the method comprises:
respectively obtaining word expressions of words in a query and word expressions of words in a title;
respectively obtaining context-based word expressions of words in the query and context-based word expressions of words in the title according to the word expressions;
generating matching features according to obtained information;
determining a matching degree score between the query and the title according to the matching features,
the respectively obtaining word expressions of words in a query and word expressions of words in a title comprises:
respectively embedding words in the query to form a low-dimensional vector, thereby obtaining a sequence $Qe=[q1, \ldots, qi, \ldots, qm]$;
wherein m represents the number of words included in the query, qi represents the low-dimensional vector of the $i^{th}$ word in the query, i is a positive integer, and $1 \leq i \leq m$;
respectively embedding words in the title to form a low-dimensional vector, thereby obtaining a sequence $Te=[t1, \ldots, tj, \ldots, tn]$;
wherein n represents the number of words included in the title, tj represents the low-dimensional vector of the $j^{th}$ word in the title, j is a positive integer, and $1 \leq j \leq n$;
the respectively obtaining context-based word expressions of words in the query and context-based word expressions of words in the title according to the word expressions comprises:
inputting the Qe into a bidirectional Recurrent Neural Network RNN to respectively obtain a processed output Q1 in a left-right direction and a processed output Q2 in a right-left direction;
inputting the Te into the bidirectional RNN to respectively obtain a processed output T1 in a left-right direction and a processed output T2 in a right-left direction;
putting together the Qe, Q1 and Q2 to obtain a sequence Q (m, 3d), wherein the d represents an expression dimension, and embedding and the bidirectional RNN use the same expression dimension;
putting together the Te, T1 and T2 to obtain a sequence T (n, 3d);

considering a 3d-long vector corresponding to each word in the query and the title as the context-based word expression of the word,
the generating matching features according to obtained information comprises:
generating local matching features according to the obtained information;
generating matching features according to the local matching features
the generating local matching features according to the obtained information comprises:
according to context-based word expressions of respective words, calculating a matching degree of any two words in words in the query and words in the title respectively in different matching degree calculating manners, and obtaining a 3-dimensional tensor (m, n, t);
wherein t represents a t-dimensional vector, t matching degrees are respectively calculated with respect to each group of words Q[i] and T[j], the t matching degrees constitute a t-dimensional vector, Q[i] represents words in the query, and T[j] represents words in the title;
each value (i, j, k) in the tensor represents the $k^{th}$ matching degree corresponding to Q[i] and T[j], and $1 \leq k \leq t$.

2. The method according to claim 1, wherein
the generating matching features according to the local matching features comprises:
inputting (m, n, t) to a Convolutional Neural Network CNN, and considering the obtained output (m, n, t1), . . . , (m, n, tw) as matching features, wherein w is a positive integer and represents the number of convolution layers included in CNN.

3. The method according to claim 2, wherein
the determining a matching degree score between the query and the title according to the matching features comprises:
putting together the (m, n, t) and the matching features to obtain (m, n, t+t1+. . . +tw*k');
regarding each (m, n) matching matrix, respectively determining a (m, k') sequence expression in a manner of pooling as per row, k' being a positive integer, thereby obtaining (m, (t+t1+. . . +tw)*k');
inputting the (m, (t+t1+. . . +tw)*k') into the bidirectional RNN to obtain an expression at the last position of the bidirectional RNN;
determining the matching degree score according to the expression at the last position.

4. The method according to claim 3, wherein
the step of, regarding each (m, n) matching matrix, respectively determining a (m, k') sequence expression in a manner of pooling as per row, comprises:
regarding n values in each row of (m, n), respectively selecting k' largest values therefrom, ranking them in a descending order and thereby obtaining (m, k'), wherein $k' \leq n$.

5. The method according to claim 3, wherein
the expression at the last position is a 2f-long vector, and f represents an expression dimension;
the determining the matching degree score according to the expression at the last position comprises:
inputting the 2f-long vector into a fully-connected network including a single hidden layer, and obtaining the output matching degree score.

6. A computer device, comprising a memory, a processor and a computer program which is stored on the memory and runs on the processor, wherein the processor, upon executing the program, implements the following operation:
respectively obtaining word expressions of words in a query and word expressions of words in a title;
respectively obtaining context-based word expressions of words in the query and context-based word expressions of words in the title according to the word expressions;
generating matching features according to obtained information;
determining a matching degree score between the query and the title according to the matching features,
the respectively obtaining word expressions of words in a query and word expressions of words in a title comprises:
respectively embedding words in the query to form a low-dimensional vector, thereby obtaining a sequence Qe=[q1, . . . , qi, . . . , qm];
wherein m represents the number of words included in the query, qi represents the low-dimensional vector of the $i^{th}$ word in the query, i is a positive integer, and $1 \leq i \leq m$;
respectively embedding words in the title to form a low-dimensional vector, thereby obtaining a sequence Te=[t1, . . . , tj, . . . , tn];
wherein n represents the number of words included in the title, tj represents the low-dimensional vector of the $j^{th}$ word in the title, j is a positive integer, and $1 \leq j \leq n$,
the respectively obtaining context-based word expressions of words in the query and context-based word expressions of words in the title according to the word expressions comprises:
inputting the Qe into a bidirectional Recurrent Neural Network RNN to respectively obtain a processed output Q1 in a left-right direction and a processed output Q2 in a right-left direction;
inputting the Te into the bidirectional RNN to respectively obtain a processed output T1 in a left-right direction and a processed output T2 in a right-left direction;
putting together the Qe, Q1 and Q2 to obtain a sequence Q (m, 3d), wherein the d represents an expression dimension, and embedding and the bidirectional RNN use the same expression dimension;
putting together the Te, T1 and T2 to obtain a sequence T (n, 3d);
considering a 3d-long vector corresponding to each word in the query and the title as the context-based word expression of the word,
the generating matching features according to obtained information comprises:
generating local matching features according to the obtained information;
generating matching features according to the local matching features,
the generating local matching features according to the obtained information comprises:
according to context-based word expressions of respective words, calculating a matching degree of any two words in words in the query and words in the title respectively in different matching degree calculating manners, and obtaining a 3-dimensional tensor (m, n, t);
wherein t represents a t-dimensional vector, t matching degrees are respectively calculated with respect to each group of words Q[i] and T[j], the t matching degrees constitute a t-dimensional vector, Q[i] represents words in the query, and T[j] represents words in the title;
each value (i, j, k) in the tensor represents the $k^{th}$ matching degree corresponding to Q[i] and T[j], and $1 \leq k \leq t$, the generating matching features according to the local matching features comprises:

inputting (m, n, t) to a Convolutional Neural Network CNN, and considering the obtained output (m, n, t1), . . . , (m, n, tw) as matching features, wherein w is a positive integer and represents the number of convolution layers included in CNN.

7. The computer device according to claim 6, wherein the determining a matching degree score between the query and the title according to the matching features comprises:

putting together the (m, n, t) and the matching features to obtain (m, n, t+t1+. . . +tw);

regarding each (m, n) matching matrix, respectively determining a (m, k') sequence expression in a manner of pooling as per row, k' being a positive integer, thereby obtaining (m, (t+t1+. . . +tw)*k');

inputting the (m, (t+t1+. . . +tw)*k') into the bidirectional RNN to obtain an expression at the last position of the bidirectional RNN;

determining the matching degree score according to the expression at the last position.

8. The computer device according to claim 7, wherein the operation of, regarding each (m, n) matching matrix, respectively determining a (m, k') sequence expression in a manner of pooling as per row, comprises:

regarding n values in each row of (m, n), respectively selecting k' largest values therefrom, ranking them in a descending order and thereby obtaining (m, k'), wherein k'≤n.

9. The computer device according to claim 7, wherein the expression at the last position is a 2f-long vector, and f represents an expression dimension;

the determining the matching degree score according to the expression at the last position comprises:

inputting the 2f-long vector into a fully-connected network including a single hidden layer, and obtaining the output matching degree score.

10. A non-transitory computer-readable storage medium on which a computer program is stored, wherein the program, when executed by a processor, implements the following operation:

respectively obtaining word expressions of words in a query and word expressions of words in a title;

respectively obtaining context-based word expressions of words in the query and context-based word expressions of words in the title according to the word expressions;

generating matching features according to obtained information;

determining a matching degree score between the query and the title according to the matching features, the respectively obtaining word expressions of words in a query and word expressions of words in a title comprises:

respectively embedding words in the query to form a low-dimensional vector, thereby obtaining a sequence Qe=[q1, . . . , qi, . . . , qm];

wherein m represents the number of words included in the query, qi represents the low-dimensional vector of the $i^{th}$ word in the query, i is a positive integer, and 1≤i≤m;

respectively embedding words in the title to form a low-dimensional vector, thereby obtaining a sequence Te=[t1, . . . , tj, . . . , tn];

wherein n represents the number of words included in the title, tj represents the low-dimensional vector of the $j^{th}$ word in the title, j is a positive integer, and 1≤j≤n, the respectively obtaining context-based word expressions of words in the query and context-based word expressions of words in the title according to the word expressions comprises:

inputting the Qe into a bidirectional Recurrent Neural Network RNN to respectively obtain a processed output Q1 in a left-right direction and a processed output Q2 in a right-left direction;

inputting the Te into the bidirectional RNN to respectively obtain a processed output T1 in a left-right direction and a processed output T2 in a right-left direction;

putting together the Qe, Q1 and Q2 to obtain a sequence Q (m, 3d), wherein the d represents an expression dimension, and embedding and the bidirectional RNN use the same expression dimension;

putting together the Te, T1 and T2 to obtain a sequence T (n, 3d);

considering a 3d-long vector corresponding to each word in the query and the title as the context-based word expression of the word, the generating matching features according to obtained information comprises:

generating local matching features according to the obtained information;

generating matching features according to the local matching features, the generating local matching features according to the obtained information comprises:

according to context-based word expressions of respective words, calculating a matching degree of any two words in words in the query and words in the title respectively in different matching degree calculating manners, and obtaining a 3-dimensional tensor (m, n, t);

wherein t represents a t-dimensional vector, t matching degrees are respectively calculated with respect to each group of words Q[i] and T[j], the t matching degrees constitute a t-dimensional vector, Q[i] represents words in the query, and T[j] represents words in the title;

each value (i, j, k) in the tensor represents the $k^{th}$ matching degree corresponding to Q[i] and T[j], and 1≤k≤t the generating matching features according to the local matching features comprises:

inputting (m, n, t) to a Convolutional Neural Network CNN, and considering the obtained output (m, n, t1), (m, n, tw) as advanced matching features, wherein w is a positive integer and represents the number of convolution layers included in CNN.

11. The non-transitory computer-readable storage medium according to claim 10, wherein the determining a matching degree score between the query and the title according to the matching features comprises:

putting together the (m, n, t) and the matching features to obtain (m, n, t+t1+. . . +tw);

regarding each (m, n) matching matrix, respectively determining a (m, k') sequence expression in a manner of pooling as per row, k' being a positive integer, thereby obtaining (m, (t+t1+. . . +tw)*k');

inputting the (m, (t+t1+. . . +tw)*k') into the bidirectional RNN to obtain an expression at the last position of the bidirectional RNN;

determining the matching degree score according to the expression at the last position.

12. The non-transitory computer-readable storage medium according to claim 11, wherein
the operation of, regarding each (m, n) matching matrix, respectively determining a (m, k') sequence expression in a manner of pooling as per row, comprises:
regarding n values in each row of (m, n), respectively selecting k' largest values therefrom, ranking them in a descending order and thereby obtaining (m, k'), wherein k'≤n.

13. The non-transitory computer-readable storage medium according to claim 11, wherein
the expression at the last position is a 2f-long vector, and f represents an expression dimension;
the determining the matching degree score according to the expression at the last position comprises:
inputting the 2f-long vector into a fully-connected network including a single hidden layer, and obtaining the output matching degree score.

* * * * *